United States Patent
Jeong et al.

(10) Patent No.: US 9,700,960 B2
(45) Date of Patent: Jul. 11, 2017

(54) LASER PROCESSING APPARATUS

(71) Applicant: SAMSUNG DISPLAY CO., LTD., Yongin-si, Gyeonggi-do (KR)

(72) Inventors: Il-Young Jeong, Yongin (KR); Gyoo-Wan Han, Yongin (KR); Jun-Hyung Kim, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 328 days.

(21) Appl. No.: 13/784,724

(22) Filed: Mar. 4, 2013

(65) Prior Publication Data

US 2014/0097162 A1 Apr. 10, 2014

(30) Foreign Application Priority Data

Oct. 10, 2012 (KR) .................. 10-2012-0112663

(51) Int. Cl.
 *B23K 26/142* (2014.01)
 *B23K 26/362* (2014.01)

(52) U.S. Cl.
 CPC .......... *B23K 26/142* (2015.10); *B23K 26/362* (2013.01)

(58) Field of Classification Search
 CPC B23K 26/1405; B23K 26/14; B23K 26/1464; B23K 26/0807; B23K 26/365
 See application file for complete search history.

(56) References Cited

U.S. PATENT DOCUMENTS

| 4,166,761 | A | * | 9/1979 | Aloupis ................. G21B 1/23 219/121.36 |
| 4,439,012 | A | * | 3/1984 | Christy ............. G02B 17/0694 359/859 |
| 5,237,150 | A | * | 8/1993 | Karube ............. B23K 26/0643 219/121.72 |
| 5,317,589 | A | * | 5/1994 | Ogawa et al. ................. 372/99 |
| 5,570,384 | A | * | 10/1996 | Nishida ............... B23K 26/032 372/19 |
| 5,662,762 | A | * | 9/1997 | Ranalli ....................... 156/707 |
| 5,728,993 | A | * | 3/1998 | O'Neill .................... 219/121.67 |
| 5,981,901 | A | * | 11/1999 | La Rocca ........... B23K 26/123 219/121.63 |

(Continued)

FOREIGN PATENT DOCUMENTS

| JP | 2006212679 | * | 8/2006 |
| KR | 10-2011-0062886 A | | 6/2011 |

(Continued)

*Primary Examiner* — David Angwin
*Assistant Examiner* — Frederick Calvetti
(74) *Attorney, Agent, or Firm* — Lewis Roca Rothgerber Christie LLP

(57) ABSTRACT

A laser processing apparatus using a laser. The laser processing apparatus includes a light source for generating a hollow laser beam in a first direction; a reflection member for changing a path of the hollow laser beam toward the first direction into a second direction toward the substrate; a lens for collecting the hollow laser beam reflected by the reflection member; and an air supply unit for supplying air toward particles generated while the substrate is processed by the hollow laser beam, wherein the lens has a first hole passing through the lens, the reflection member has a second hole passing through the reflection member, and the first and second holes form a discharge path of the particles.

24 Claims, 3 Drawing Sheets

(56) References Cited

U.S. PATENT DOCUMENTS

| | | | | |
|---|---|---|---|---|
| 6,034,343 | A * | 3/2000 | Hashimoto et al. | 219/74 |
| 6,294,754 | B1 * | 9/2001 | Nagura | B23K 26/0604 |
| | | | | 219/121.63 |
| 6,417,487 | B2 * | 7/2002 | Nagura | B23K 26/0604 |
| | | | | 219/121.77 |
| 6,531,682 | B1 * | 3/2003 | Guttler | 219/121.84 |
| 6,664,504 | B2 * | 12/2003 | Bertez | B23K 26/0608 |
| | | | | 219/121.78 |
| 6,664,507 | B2 * | 12/2003 | Akaba | B23K 26/1429 |
| | | | | 219/121.63 |
| 6,880,646 | B2 * | 4/2005 | Batarseh | E21B 43/24 |
| | | | | 166/222 |
| 7,465,945 | B2 * | 12/2008 | Tokuda | G01N 23/225 |
| | | | | 250/492.1 |
| 8,274,735 | B2 * | 9/2012 | Fry | B23K 26/032 |
| | | | | 356/244 |
| 2004/0226927 | A1 * | 11/2004 | Morikazu | B23K 26/123 |
| | | | | 219/121.84 |
| 2005/0016970 | A1 * | 1/2005 | Bayer et al. | 219/121.46 |
| 2005/0064137 | A1 * | 3/2005 | Hunt et al. | 428/131 |
| 2007/0056941 | A1 * | 3/2007 | Murase et al. | 219/121.84 |
| 2007/0145026 | A1 * | 6/2007 | Murase et al. | 219/121.84 |
| 2007/0210045 | A1 * | 9/2007 | Aso et al. | 219/121.71 |
| 2008/0087640 | A1 * | 4/2008 | Miyairi | B23K 26/0807 |
| | | | | 216/65 |
| 2008/0210675 | A1 * | 9/2008 | Sasaki | B23K 26/1476 |
| | | | | 219/121.84 |
| 2008/0251504 | A1 * | 10/2008 | Lu et al. | 219/121.64 |
| 2009/0068598 | A1 * | 3/2009 | Murase et al. | 430/311 |
| 2009/0188901 | A1 * | 7/2009 | Dantus | B23K 26/032 |
| | | | | 219/121.76 |
| 2009/0294412 | A1 * | 12/2009 | Kono | B23K 1/0056 |
| | | | | 219/121.6 |
| 2010/0309566 | A1 * | 12/2010 | DeWitt | G02B 5/001 |
| | | | | 359/729 |
| 2011/0056921 | A1 * | 3/2011 | Belletti | B23K 26/1476 |
| | | | | 219/121.67 |
| 2012/0176600 | A1 * | 7/2012 | Falk | G01N 21/65 |
| | | | | 356/51 |
| 2012/0181454 | A1 * | 7/2012 | Kubota | 250/492.1 |
| 2012/0241649 | A1 * | 9/2012 | Nishihara | H05G 2/008 |
| | | | | 250/504 R |

FOREIGN PATENT DOCUMENTS

| | | |
|---|---|---|
| KR | 10-2012-0038398 | 4/2012 |
| KR | 10-2012-0065033 A | 6/2012 |
| WO | WO9110533 * | 7/1991 |
| WO | WO2010/117993 A1 | 10/2010 |

* cited by examiner

LASER PROCESSING APPARATUS

CROSS-REFERENCE TO RELATED PATENT APPLICATION

This application claims priority to and the benefit of Korean Patent Application No. 10-2012-0112663, filed on Oct. 10, 2012, in the Korean Intellectual Property Office, the disclosure of which is incorporated herein in its entirety by reference.

BACKGROUND

1. Field

The following description relates to a laser processing apparatus.

2. Description of the Related Art

In general, a substrate for a display device, such as a liquid crystal display (LCD) device, a plasma display device, or an organic light-emitting display device, may be formed of glass.

One of the methods of processing a substrate for a display device is a scribe wheel method. The scribe wheel method needs a dummy area having a size equal to or greater than a set or predetermined size and generates particles during the scribing process, and thus additional washing and drying processes for removing the particles are required. Also, the scribe wheel method results in an uneven processed surface and an increase in cost of consumption goods.

In order to resolve the above-described problems, an apparatus using a laser is used. A laser process has advantages of an even processed surface and ease of control. During the laser process, particles or fumes are generated, and thus it is important to discharge the particles or fumes so as not to hinder processing of a substrate.

SUMMARY

Aspects of embodiments of the present invention are directed toward a substrate processing apparatus, and more particular, a structure of a laser processing apparatus.

According to an embodiment of the present invention, there is provided a laser processing apparatus using a laser, the laser processing apparatus including: a light source for generating a hollow laser beam in a first direction; a reflection member for changing a path of the hollow laser beam toward the first direction into a second direction toward the substrate; a lens for focusing the hollow laser beam reflected by the reflection member; and an air supply unit for supplying air toward particles generated while the substrate is processed by the hollow laser beam, wherein the lens has a first hole passing through the lens, the reflection member has a second hole passing through the reflection member, and the first and second holes form a discharge path of the particles.

The first and second holes may be aligned on the same axial line.

A size of the first hole may be different from that of the second hole.

The size of the second hole may be smaller than that of the first hole.

The first hole may include a first groove formed in a first spiral direction along an inner circumferential surface of the first hole, and the second hole may include a second groove formed in the first spiral direction along an inner circumferential surface of the second hole.

The first groove may swivel around the inner circumferential surface of the first hole in an anticlockwise direction along a direction away from the substrate, and the second groove may swivel around the inner circumferential surface of the second hole in the anticlockwise direction along the direction away from the substrate.

The air supply unit may supply air in a direction perpendicular to the second direction so as to move the particles to a location corresponding to the first hole.

The laser processing apparatus may further include a sucking unit that is located at the end of the discharge path of the particles and discharges (sucks) the particles.

The laser processing apparatus may further include a first window member that is located on the path of the hollow laser beam and spatially separates the light source and the discharge path so that the particles moving toward the first hole do not move toward the light source.

The laser processing apparatus may further include a second window member that is disposed adjacent to a first surface of the lens facing the reflection member.

The second window member may contact at least a part of the first surface of the lens.

The laser processing apparatus may further include a third window member that is disposed adjacent to a second surface of the lens facing the substrate.

The third window member may contact at least a part of the second surface of the lens.

The laser processing apparatus may further include a blocking member that forms an air-wall by discharging air toward the substrate in the second direction to prevent the particles from moving to the outside.

According to another embodiment of the present invention, there is provided a laser processing apparatus using a laser, the laser processing apparatus including: a light source for generating a hollow laser beam; a reflection member for changing a path of the hollow laser beam so that the hollow laser beam proceeds toward the substrate; a lens for focusing the hollow laser beam reflected by the reflection member; and an air supply unit for supplying air toward particles generated while the substrate is processed by the hollow laser beam, wherein the lens and the reflection member form a discharge path of the particles formed on the same axial line as an optical axis of the hollow laser beam.

The lens may have a first hole aligned on the optical axis of the hollow laser beam, and the reflection member may have a second hole aligned on the optical axis of the hollow laser beam.

A size of the second hole may be smaller than that of the first hole.

The discharge path of the particles may include a groove having a spiral shape and swiveling around an inner circumferential surface of the discharge path of the particles in an anticlockwise direction along a direction away from the substrate in an inner surface of the discharge path of the particles.

The laser processing apparatus may further include a first window member that is located on the path of the hollow laser beam and spatially separates the light source and the discharge path so that the particles do not move toward the light source.

The laser processing apparatus may further include a window member that is disposed adjacent to at least one of a first surface of the lens, which faces the reflection member, and a second surface of the lens, which faces the substrate, and prevents the lens from being polluted by the particles.

The window member may have a hole that forms the discharge path of the particles.

The laser processing apparatus may further include a sucking unit that is located at the end of the discharge path of the particles and discharges (sucks) the particles.

The laser processing apparatus may further include a blocking member that forms an air-wall by discharging air toward the substrate to prevent the particles from moving to the outside.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Figure 1:
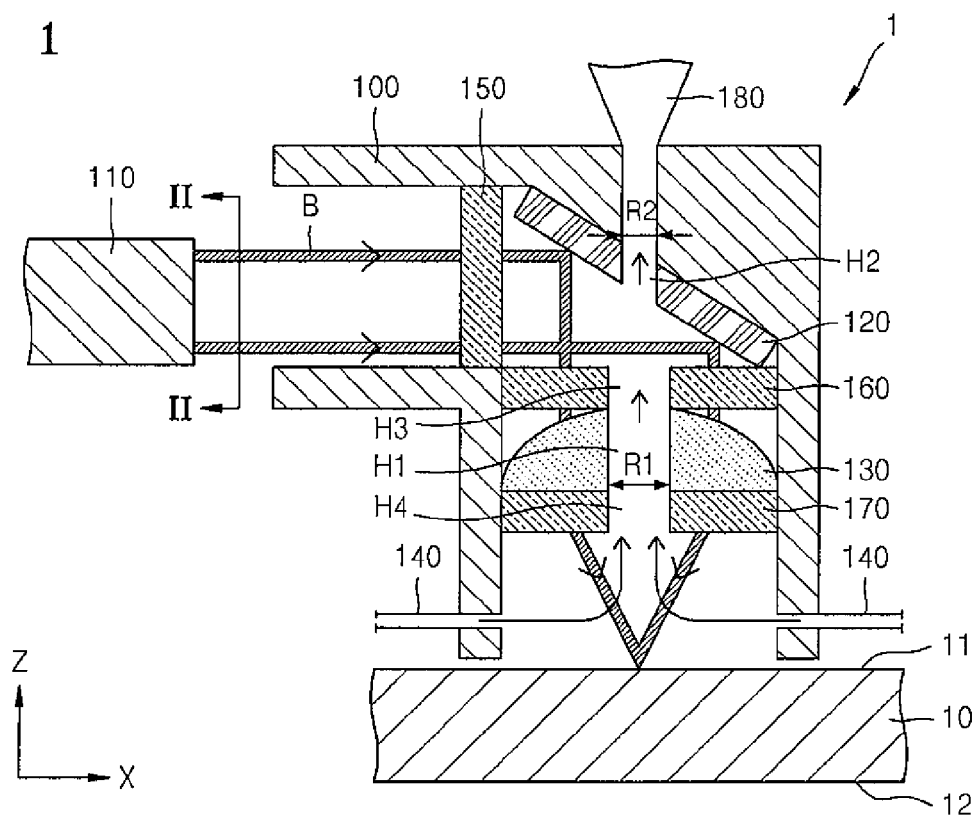
FIG. 1 is a schematic cross-sectional view of a laser processing apparatus according to an embodiment of the present invention.

Various changes in form and details may be made to the present inventive concept and thus should not be construed as being limited to the embodiments set forth herein. The inventive concept is not limited to the embodiments described in the present description, and thus it should be understood that the inventive concept does not include every kind of variation example or alternative equivalent included in the spirit and scope of the inventive concept. Also, while describing the embodiments, detailed descriptions about related well-known functions or configurations that may diminish the clarity of the points of the embodiments of the present invention may be omitted.

In the present description, terms such as 'first', 'second', etc. are used to describe various elements. However, it should be apparent that the elements may not be defined by these terms. The terms are used only for distinguishing one element from another element.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items.

In the drawings, the thicknesses of layers and regions are exaggerated for clarity. Like reference numerals denote like elements throughout the specification. Throughout the specification, it will also be understood that when an element such as layer, region, or substrate is referred to as being "on" another element, it can be directly on the other element, or intervening elements may also be present. Expressions such as "at least one of," when preceding a list of elements, modify the entire list of elements and do not modify the individual elements of the list.

In the present specification, a first direction denotes an x-axis direction (or (−x)-axis direction) parallel to a substrate 10, a second direction denotes a direction perpendicular to and toward the substrate 10, that is, (−z)-axis direction, and a third direction indicates a direction perpendicular to and away from the substrate 10, that is, a z-axis direction.

Figure 2:
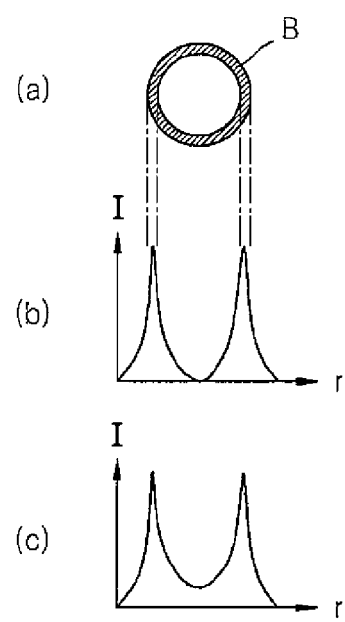
FIG. 2(a) shows a cross-section of a hollow laser beam generated by a light source shown in FIG. 1.
FIGS. 2(b) and 2(c) are schematic graphs showing an intensity of a laser beam shown in FIG. 2(a)

FIG. 1 is a schematic cross-sectional view of a laser processing apparatus 1 according to an embodiment of the present invention. FIG. 2(a) shows a cross-section of a hollow laser beam B generated by a light source 110 shown in FIG. 1. FIGS. 2(b) and 2(c) are schematic graphs showing an intensity of the hollow laser beam B shown in FIG. 2(a).

Referring to FIG. 1, the laser processing apparatus 1 of the current embodiment may include a housing 100, the light source 110 which generates the hollow laser beam B (hereinafter, referred to as a laser beam), a reflection member 120 disposed on a path of the laser beam B, and a lens 130. The laser processing apparatus 1 may also include an air supply unit 140 and a sucking (vacuum) unit 180 that are used to discharge particles generated during processing of the substrate 10. Also, the laser processing apparatus 1 may include a first window member 150, a second window member 160, and a third window member 170 to prevent (protect) the light source 110 and the lens 130 from being polluted by the particles. A distance between the lens 130 and a top surface 11 of the substrate 10 may be 1 mm or greater. If the distance between the lens 130 and the top surface 11 of the substrate 10 is too short, the particles may hinder processing of the substrate 10, and thus the processing precision of the substrate 10 may be decreased.

The housing 100 may provide (guide) a path for the laser beam B generated by the light source 110 and provide (guide) a discharge path of the particles generated during the processing of the substrate 10. The housing 100 may be bent to be approximately perpendicular. One end of an inner space of the housing 100 is adjacent to the light source 110, and the other end may be adjacent to the substrate 10 to be processed.

The light source 110 generates the laser beam B in the first direction. Referring to FIG. 2(a), a cross-section of the laser beam B, which is a hollow laser beam, may be a circular shape (ring shape) having a set or predetermined thickness. The laser beam B may have a set or predetermined intensity I in a radial direction, and the intensity I of the laser beam B is shown in FIG. 2(b) or 2(c). Although the laser beam B is completely shown as a round circular shape in the current embodiment, the present invention is not limited thereto. Alternatively, if the laser beam B has a shape having a set or predetermined intensity in a radial direction, the laser beam B may have an oval circular shape.

In the current embodiment, the same effect as using the lens 130 having a relatively large depth of focus (DOF) may be obtained by allowing the light source 110 to generate the laser beam B. In other words, even if the lens 130 for securing the DOF is not additionally prepared, a DOF sufficient to simultaneously process a bottom surface 12 of the substrate 10 and the top surface 11 of the substrate 10 may be secured by using the laser beam B.

Also, since the hollow laser beam B is used in the laser processing apparatus 1, it is possible to process the substrate 10 without hindrance by the particles that are discharged in the third direction which is located on the axial direction of an optical axis of the laser beam B.

Referring back to FIG. 1, the reflection member 120 may bend the optical axis of the laser beam B. For example, the laser beam B proceeding along the first direction may be bent to the second direction that is a direction perpendicular to the substrate 10. The path of the laser beam B is changed by the reflection member 120, and thus the laser beam B may proceed toward the substrate 10. The reflection member 120 may be a reflective mirror, but the present invention is not limited thereto. Alternatively, the reflection member 120 may be, for example, a prism.

The lens 130 is an optical member for focusing the laser beam B, of which path is changed by the reflection member 120, on the substrate 10. The lens 130 may be disposed between the reflection member 120 and the substrate 10. The top surface 11 and/or the bottom surface 12 are processed by the laser beam B focused on the substrate 10 by the lens 130, and the particles generated during the processing of the substrate 10 may be discharged in the third direction away from the substrate 10.

The reflection member 120 and the lens 130 respectively has a first hole H1 and a second hole H2 penetrating therethrough. The first hole H1 formed in the lens 130 and the second hole H2 formed in the reflection member 120 may form the discharge path of the particles. The discharge path of the particles may be located on the axial direction of an optical axis of the laser beam B. The first hole H1 and the second hole H2 may be located on the same axle as, for example, a ±z-axis perpendicular to the substrate 10.

The air supply unit 140 is disposed in a lateral surface of the housing 100 and may supply air toward the particles generated from the substrate 10. The particles are collected in a portion corresponding to the first hole H1/the second hole H2 due to the air discharged by the air supply unit 140, and thus the particles proceed along the discharge path formed by the first hole H1 and the second hole H2. Here, the particles are discharged with the air toward a direction out of the housing 100.

A size of the first hole H1 formed in the lens 130 may be greater than that of the second hole H2 formed in the reflection member 120. For example, a diameter R2 of the second hole H2 may be formed smaller than a diameter R1 of the first hole H1. Accordingly, a difference in pressure between the first hole H1 and the second hole H2 is generated to thereby rapidly suck the particles moving in the third direction due to the difference in pressure.

The sucking unit 180 is disposed at an end of the discharge path. The sucking unit 180 may help the air flow so that the particles move along the discharge path formed by the first hole H1 and the second hole H2. The sucking unit 180 includes a storage space (not shown) to collect the particles having moved along the discharge path.

In the current embodiment, the particles generated during the processing of the substrate 10 may move in the third direction along the discharge path formed by the first hole H1 and the second hole H2, that is, in the z-axis direction. Here, if some of the particles moving in the third direction move toward the light source 110, the particles may adhere to a surface of the light source 110. If the particles adhere to the surface of the light source 110, it may be difficult for the light source 110 to generate the laser beam B having a sufficient intensity, and a shape of the cross-section of the laser beam B may be distorted, and thus it is difficult to precisely process the substrate 10.

However, according to the current embodiment, since the first window member 150 spatially separates the light source 110 and the discharge path of the particles, the above-described problems may be prevented. For example, the first window member 150 may be located between the light source 110 and the reflection member 120 on the path of the laser beam B. Accordingly, even though some of the particles move toward the light source 110, the particles are blocked by the first window member 150, and thus the particles may be prevented from depositing or adhering to the surface of the light source 110.

The second window member 160 may be disposed adjacent to a first surface of the lens 130 to prevent the first surface of the lens 130, for example, a top surface of the lens 130, from being polluted by the particles. For example, the second window member 160 may be disposed to contact at least a part of the first surface of the lens 130 to prevent the particles passing through the first hole H1 of the lens 130 from depositing or adhering onto the first surface of the lens 130.

The third window member 170 may be disposed adjacent to a second surface of the lens 130 so as to prevent a second surface of the lens 130, for example, a bottom surface of the lens 130, from being polluted by the particles. For example, the third window member 170 may be disposed to contact at least a part of the second surface of the lens 130 so as to prevent the particles generated from the substrate 10 from depositing or adhering to the bottom surface of the lens 130.

A third hole H3 and a fourth hole H4 are respectively formed in the second window member 160 and the third window member 170 to form the discharge path of the particles. The third hole H3 and the fourth hole H4 may be formed to have the same size of the first hole H1 formed in the lens 130.

Figure 3:
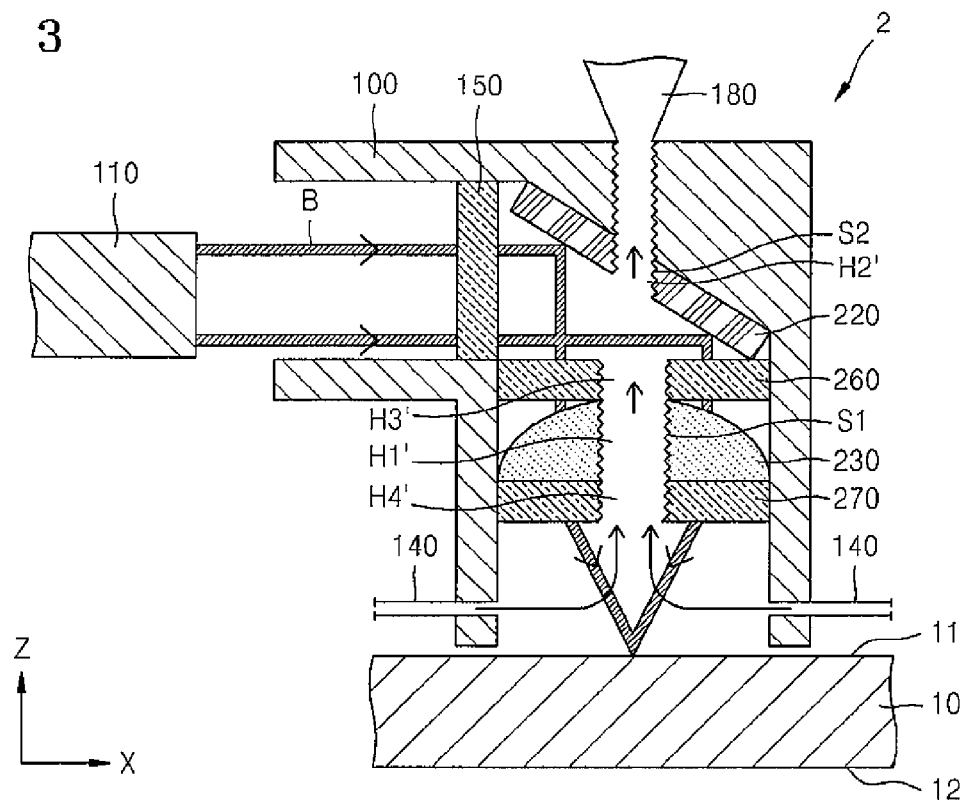
FIG. 3 is a schematic cross-sectional view of a laser processing apparatus according to another embodiment of the present invention.
Figure 4:
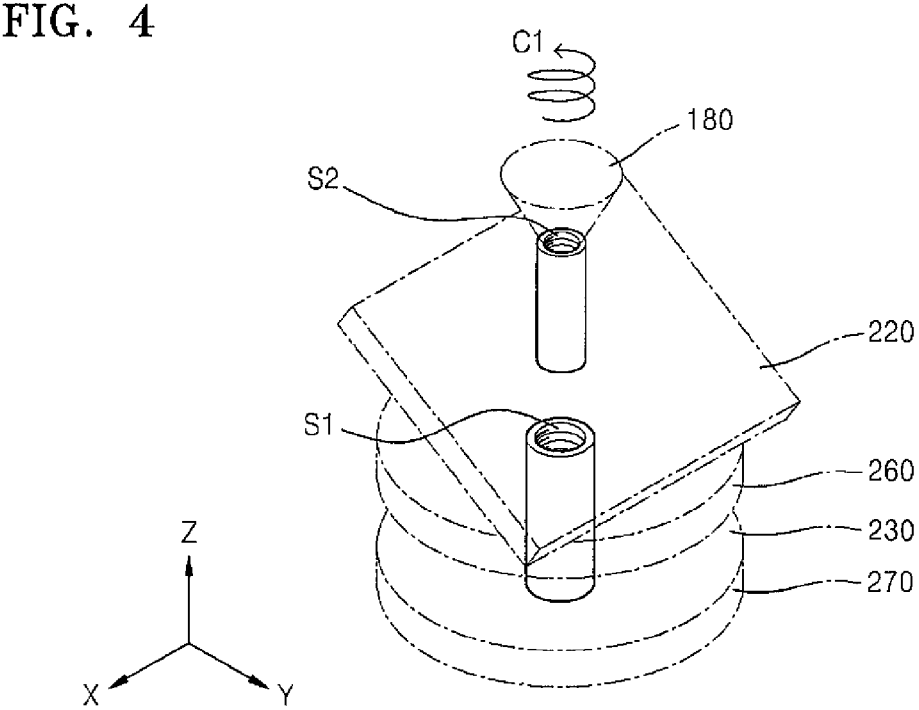
FIG. 4 is a partial perspective view of a discharge path of particles, according to an embodiment of the present invention.

FIG. 3 is a schematic cross-sectional view of a laser processing apparatus 2 according to another embodiment of the present invention. FIG. 4 is a partial perspective view of the discharge path of the particles, according to an embodiment of the present invention.

Referring to FIG. 3, the laser processing apparatus 2 according to the current embodiment may include the housing 100, the light source 110 which generates the laser beam B, a reflection member 220 disposed on a path of the laser beam B, a lens 230, the air supply unit 140, and the sucking unit 180. The laser processing apparatus 2 may also include the first window member 150, a second window member 260, and a third window member 270 to prevent the light source 110 and the lens 230 from being polluted by the particles. A detailed structure and functions of the laser processing apparatus 2 are as described above with reference to FIGS. 1 to 2C.

However, the laser processing apparatus 2 of the current embodiment is different from the laser processing apparatus 1 of the previous embodiment in that in the current embodiment, first and second grooves (e.g., first and second helical grooves) S1 and S2 having a spiral shape are formed on the discharge path of the particles, and thus thrust acting in the same axial direction as the second direction/third direction is additionally applied. Descriptions of components of the current embodiment are the same as those of the components described above with reference to FIGS. 1 to 2C, and thus only differences between the previous embodiment and the current embodiment will be described below.

Referring to FIGS. 3 and 4, the first and second grooves S1 and S2 having a spiral shape may be respectively formed in a first hole H1' and a second hole H2' that form the discharge path of the particles. For example, the first hole H1' may include the first groove S1 that has a spiral shape and is formed along an inner circumferential surface of the first hole H1', and the second hole H2' may include the second groove S2 that has a spiral shape and is formed along an inner circumferential surface of the second hole H2'.

The first groove S1 and the second groove S2 may be formed in a first spiral direction C1, for example, in an anticlockwise direction along the third direction away from the substrate 10. The first groove S1 may be formed to swivel around the inner circumferential surface of the first hole H1' in an anticlockwise direction along the first spiral direction, and the second groove S2 may be formed to swivel around the inner circumferential surface of the second hole H2' in an anticlockwise direction along the second spiral direction so as to apply thrust to the particles moving in the third direction. In order to form sufficient thrust for discharging relatively heavy particles, pitches of the first groove S1 and the second groove S2 may be repeated at least three times.

The particles, which are relatively large and heavy, among the particles generated from the substrate 10, may not easily move only with a difference in pressure generated due to a difference in size between the first hole H1' and the second hole H2'. However, in the present embodiment, thrust may be applied to discharge the heavy particles by forming the first and second grooves S1 and S2 having a spiral shape as described above.

In the above embodiments, although the first and second grooves S1 and S2 having a spiral shape are respectively formed in the first hole H1' and the second hole H2', the first and second grooves S1 and S2 having a spiral shape may be formed in the entire discharge path of the particles. For example, the grooves having a spiral shape may also be formed in the first spiral direction in inner circumferences of a third hole H3' and a fourth hole H4' that are respectively formed in the second window member 260 and the third window member 270. Also, the grooves having a spiral shape may be formed in a hole formed in the housing 100, which is a discharge path through which the particles having passed through the second hole H2' are discharged to the outside.

Figure 5:
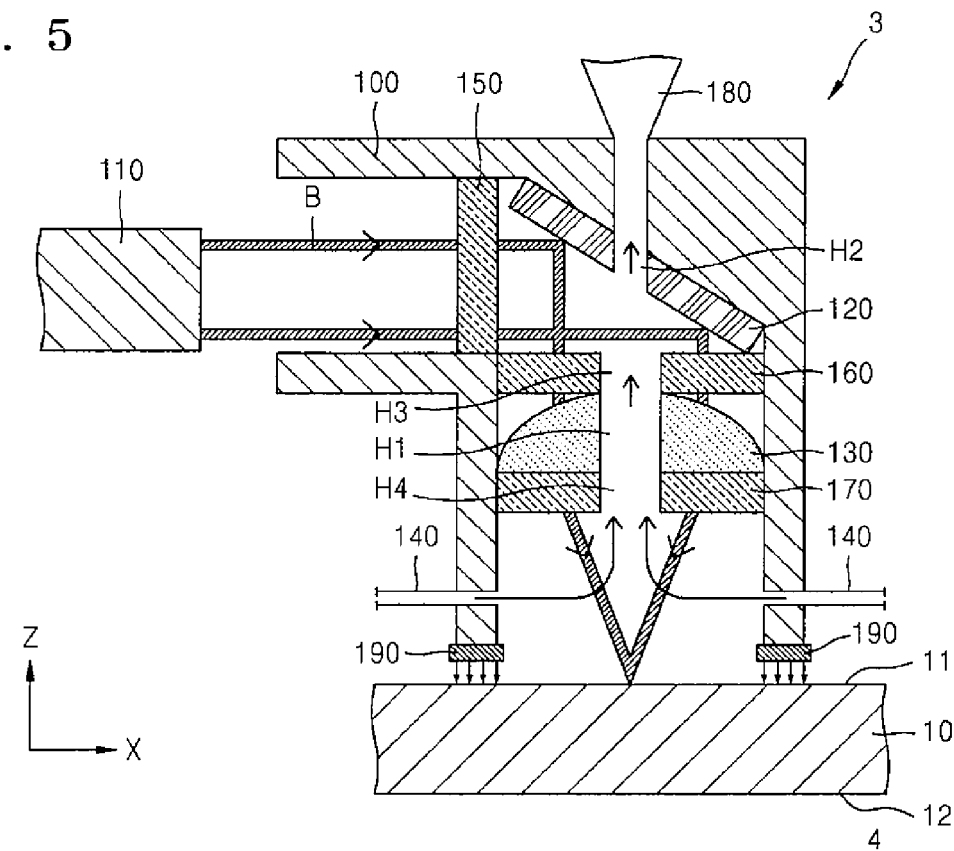
FIG. 5 is a schematic cross-sectional view of a laser processing apparatus according to another embodiment of the present invention.

FIG. 5 is a schematic cross-sectional view of a laser processing apparatus 3 according to another embodiment of the present invention.

Referring to FIG. 5, the laser processing apparatus 3 according to the current embodiment may include the housing 100, the light source 110 which generates the laser beam B, the reflection member 120 disposed on a path of the laser beam B, the lens 130, the air supply unit 140, and the sucking unit 180. The laser processing apparatus 3 may also include the first window member 150, the second window member 160, and the third window member 170 to prevent the light source 110 and the lens 130 from being polluted by the particles. A detailed structure and functions of the laser processing apparatus 3 are as described above with reference to FIGS. 1 to 2(c).

However, the laser processing apparatus 3 of the current embodiment is different from the laser processing apparatus 1 of the previous embodiment in that the laser processing apparatus 3 of the current embodiment further includes a blocking member (or air-curtain member) 190 for forming an air-wall (air curtain) in the second direction. Descriptions of components of the current embodiment are the same as those of the components described above with reference to FIGS. 1 to 2(c), and thus only differences between the previous embodiment and the current embodiment will be described below.

The blocking member 190 may discharge air in the second direction to prevent the particles from moving to the outside through a space between the top surface 11 of the substrate 10 and the housing 100. The air discharged from the blocking member 190 may be high-pressure air.

Since the particles are prevented from moving out of the housing 100 through the space between the top surface 11 of the substrate 10 and the housing 100 by the particles, the particles generated during the processing of the substrate 10 may be discharged only through the discharge path without leaking.

Figure 6:
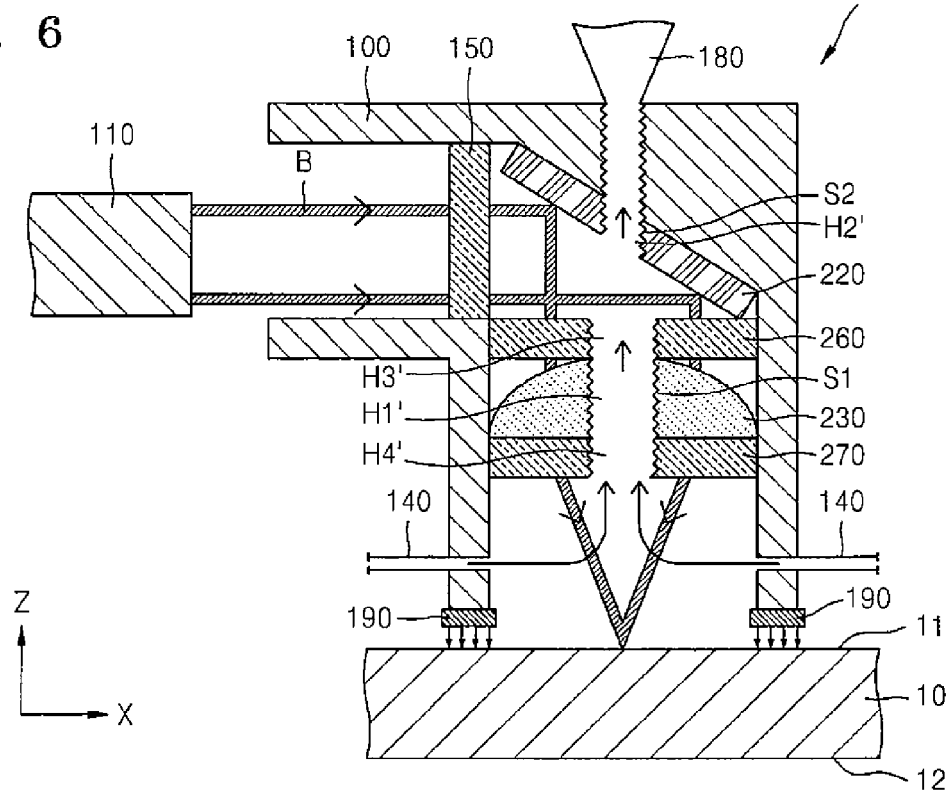
FIG. 6 is a schematic cross-sectional view of a laser processing apparatus according to another embodiment of the present invention.

FIG. 6 is a schematic cross-sectional view of a laser processing apparatus 4 according to another embodiment of the present invention.

Referring to FIG. 6, the laser processing apparatus 4 according to the current embodiment may include the housing 100, the light source 110 which generates the laser beam B, the reflection member 220 disposed on a path of the laser beam B, the lens 230, the air supply unit 140, and the sucking unit 180. The laser processing apparatus 4 may also include the first window member 150, the second window member 260, and the third window member 270 to prevent the light source 110 and the lens 230 from being polluted by the particles. The first and second grooves (e.g., first and second helical grooves) S1 and S2 are disposed on the discharge path of the particles. A detailed structure and functions of the laser processing apparatus 4 are as described above with reference to FIG. 3.

However, the laser processing apparatus 4 of the current embodiment is different from the laser processing apparatus 2 of FIG. 3 in that the laser processing apparatus 4 further includes the blocking member 190 for forming an air-wall in the second direction. Descriptions of components of the current embodiment are the same as those of the components described above with reference to FIG. 3, and thus only differences between the embodiment described with reference to FIG. 3 and the current embodiment will be described below.

The blocking member 190 may discharge air in the second direction to prevent the particles from moving to the outside toward a space between the top surface 11 of the substrate 10 and the housing 100. The air discharged from the blocking member 190 may be high-pressure air.

Since the particles are prevented from moving out of the housing 100 through the space between the top surface 11 of the substrate 10 and the housing 100 by the particles, the particles generated during the processing of the substrate 10 may be discharged only through the discharge path without leaking.

The substrate 10 processed by the laser processing apparatus 1, 2, 3, or 4 may be a substrate used to manufacture an organic light-emitting diode (OLED) apparatus. However, the present invention is not limited thereto, and the laser processing apparatuses 1, 2, 3, and 4 may be used in various ways in industrial fields in which a substrate, for example, a semiconductor device or a solar cell, needs to be processed.

Although discharging of particles has been described in the above embodiments, the present invention is not limited thereto. Thus, fumes generated during processing of a substrate may also be discharged through the same discharge path as the particles.

According to one or more embodiments of the present invention, particles generated during processing of a substrate may be rapidly discharged through a set or predetermined path so as to prevent the particles from being formed around the substrate, which is to be processed, during a laser process, thereby obtaining an excellent process quality.

Also, since a discharge path of the particles may be formed on the axial direction of an optical axis of the laser beam, the particles may be prevented from moving toward a processing area of the substrate and may be rapidly discharged/removed without hindering the processing of the substrate.

While the present invention has been particularly shown and described with reference to exemplary embodiments thereof, it will be understood by those of ordinary skill in the art that various changes in form and details may be made therein without departing from the spirit and scope of the present invention as defined by the following claims, and equivalents thereof.

What is claimed is:

1. A laser processing apparatus using a laser, the laser processing apparatus comprising:
   a housing;
   a laser light generator configured to emit a hollow laser beam in a first direction;
   a reflector disposed in the housing and on a path of the hollow laser beam, the reflector being configured to change the path of the hollow laser beam from the first direction into a second direction toward a substrate;
   a lens disposed in the housing between the laser light generator and the substrate and configured to focus the hollow laser beam reflected by the reflector; and
   an air inlet,
   wherein air is supplied toward particles generated while the substrate is processed by the hollow laser beam through the air inlet,
   wherein the lens has a first hole passing through the lens, the reflector has a second hole passing through the reflector, and the housing has a third hole passing through the housing to outside the housing, and
   wherein the first, second, and third holes are aligned on the same axial line in the second direction and form a discharge path of the supplied air and the particles to outside of the housing in a third direction opposite to the second direction.

2. A laser processing apparatus using a laser, the laser processing apparatus comprising:
   a housing;
   a laser light generator configured to generate a hollow laser beam and to emit the hollow laser beam in a first direction;
   a reflector disposed in the housing and on a path of the hollow laser beam and configured to change the path of the hollow laser beam to a second direction so that the hollow laser beam proceeds toward a substrate;
   a lens disposed in the housing between the reflector and the substrate; and
   an air inlet between the lens and the substrate,
   wherein air is supplied toward particles generated while the substrate is processed by the hollow laser beam, and
   wherein the lens, the reflector, and the housing each have a hole therein that together form a discharge path of the supplied air and the particles to outside the housing on the same axial line as an optical axis of the hollow laser beam in a third direction opposite to the second direction.

3. The laser processing apparatus of claim 2, wherein the holes in the lens and in the reflector are aligned on the optical axis of the hollow laser beam in the second direction.

4. The laser processing apparatus of claim 3, wherein a size of the hole in the reflector is smaller than that of the hole in the lens.

5. The laser processing apparatus of claim 2, wherein the discharge path of the particles includes a groove having a spiral shape and swiveling around an inner circumferential surface of the discharge path of the particles in an anticlockwise direction along a direction away from the substrate in an inner surface of the discharge path of the particles.

6. The laser processing apparatus of claim 2, further comprising a first window member that is located in the housing and on the path of the hollow laser beam and spatially separates the laser light generator and the discharge path so that the particles do not move toward the laser light generator.

7. The laser processing apparatus of claim 2, further comprising a window member that is disposed in the housing and adjacent to at least one of a first surface of the lens, which faces the reflector, and a second surface of the lens, which faces the substrate, and is configured to prevent the lens from being polluted by the particles.

8. The laser processing apparatus of claim 7, wherein the window member has a hole that forms the discharge path of the particles.

9. The laser processing apparatus of claim 2, further comprising a vacuum that is located at the hole in the housing and is configured to discharge the particles to outside the housing.

10. The laser processing apparatus of claim 2, further comprising a blocking member configured to form an airwall by discharging air toward the substrate to prevent the particles from moving to the outside.

11. A laser processing apparatus comprising:
    a housing;
    a laser light generator configured to emit a hollow laser beam in a first direction;
    a reflector arranged in the housing and on a path of the hollow laser beam, a path of the hollow laser beam being changed from the first direction into a second direction toward a substrate at the reflector;
    a lens in the housing and between the reflector and the substrate and in the path of the hollow laser beam; and
    air inlet openings in the housing between the lens and the substrate to allow air to be supplied toward particles generated while the substrate is processed by the hollow laser beam,
    wherein the lens has a first hole passing therethrough, the reflector has a second hole passing therethrough, and the housing has a third hole passing therethrough, and
    wherein the first, second, and third holes are aligned with each other in the second direction and are in fluid communication with the air inlet openings such that the first, second, and third holes together form a discharge path of the supplied air and the particles to outside the housing in a third direction opposite to the second direction.

12. The laser processing apparatus of claim 11, wherein the first and second holes are unoccupied.

13. The laser processing apparatus of claim 11, wherein a size of the first hole is different from that of the second hole.

14. The laser processing apparatus of claim 13, wherein the size of the second hole is smaller than that of the first hole.

15. The laser processing apparatus of claim 11, wherein the first hole comprises a first groove formed in a first spiral direction along an inner circumferential surface of the first hole, and the second hole comprises a second groove formed in the first spiral direction along an inner circumferential surface of the second hole.

16. The laser processing apparatus of claim 15, wherein the first groove swivels around the inner circumferential surface of the first hole in an anticlockwise direction along a direction away from the substrate, and the second groove swivels around the inner circumferential surface of the second hole in the anticlockwise direction along the direction away from the substrate.

17. The laser processing apparatus of claim 11, further comprising an air supply configured to supply the air in a direction perpendicular to the second direction so as to move the particles to a location corresponding to the first hole.

18. The laser processing apparatus of claim 11, further comprising a vacuum that is located at the third hole in the housing and is configured to discharge the particles to outside the housing.

19. The laser processing apparatus of claim 11, further comprising a first window member that is located in the housing and on the path of the hollow laser beam and spatially separates the laser light generator and the discharge path so that the particles moving toward the first hole do not move toward the laser light generator.

20. The laser processing apparatus of claim 11, further comprising a second window member that is disposed adjacent to a first surface of the lens facing the reflector.

21. The laser processing apparatus of claim 20, wherein the second window member contacts at least a part of the first surface of the lens.

22. The laser processing apparatus of claim 11, further comprising a third window member that is disposed adjacent to a second surface of the lens facing the substrate.

23. The laser processing apparatus of claim 22, wherein the third window member contacts at least a part of the second surface of the lens.

24. The laser processing apparatus of claim 23, further comprising a blocking member configured to form an air-wall by discharging air toward the substrate in the second direction to prevent the particles from moving to the outside.

* * * * *